(12) United States Patent
Brown

(10) Patent No.: US 6,592,654 B2
(45) Date of Patent: Jul. 15, 2003

(54) LIQUID EXTRACTION AND SEPARATION METHOD FOR TREATING FLUIDS UTILIZING FLOW SWIRL

(75) Inventor: Ross Brown, Murrieta, CA (US)

(73) Assignee: Cryogenic Group Inc., Murrieta, CA (US)

( * ) Notice: Subject to any disclaimer, the term of this patent is extended or adjusted under 35 U.S.C. 154(b) by 0 days.

(21) Appl. No.: 09/891,864

(22) Filed: Jun. 25, 2001

(65) Prior Publication Data

US 2002/0194994 A1 Dec. 26, 2002

(51) Int. Cl.$^7$ ............................................... B01D 45/14
(52) U.S. Cl. ............................. 95/270; 55/394; 55/404; 55/405; 96/189
(58) Field of Search .................... 95/270, 269; 55/394, 55/400, 406, 405, 404; 96/188, 189

(56) References Cited

U.S. PATENT DOCUMENTS 2,897,917 A * 8/1959 Hunter ........................ 55/405
3,785,128 A * 1/1974 Redemann ............... 415/169.2

* cited by examiner

*Primary Examiner*—Robert A. Hopkins
(74) *Attorney, Agent, or Firm*—William W. Haefliger

(57) ABSTRACT

The method of separating liquid from gas in a flow stream, that includes expanding the flow stream at a first zone to reduce flow stream pressure and increase flow stream velocity; centrifugally separating liquid from gas in the expanded flow stream, in a second zone; and increasing the pressure of the gas, from which liquid has been separated, by converting kinetic energy of the gas into pressure, at a third zone.

24 Claims, 10 Drawing Sheets

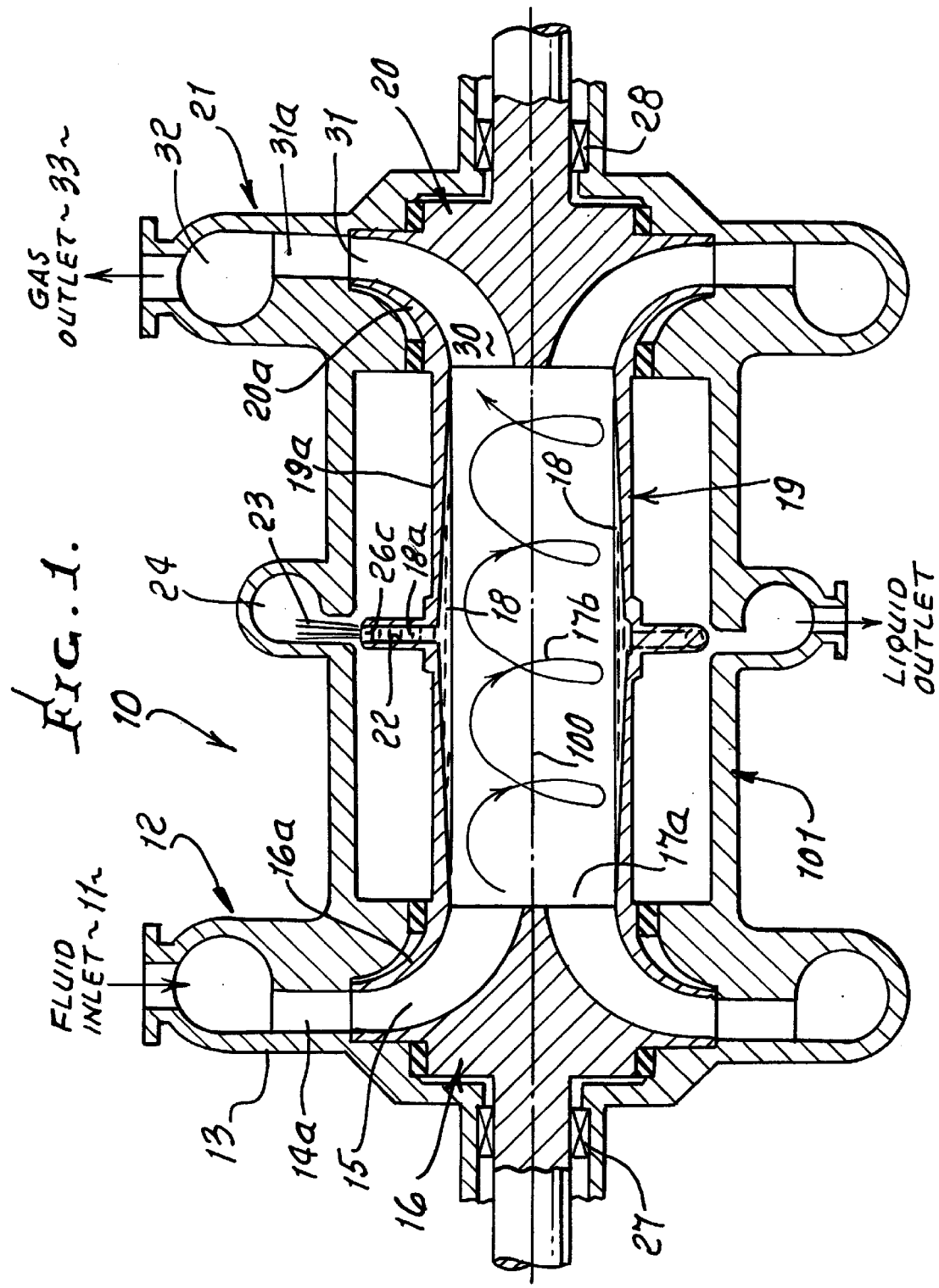

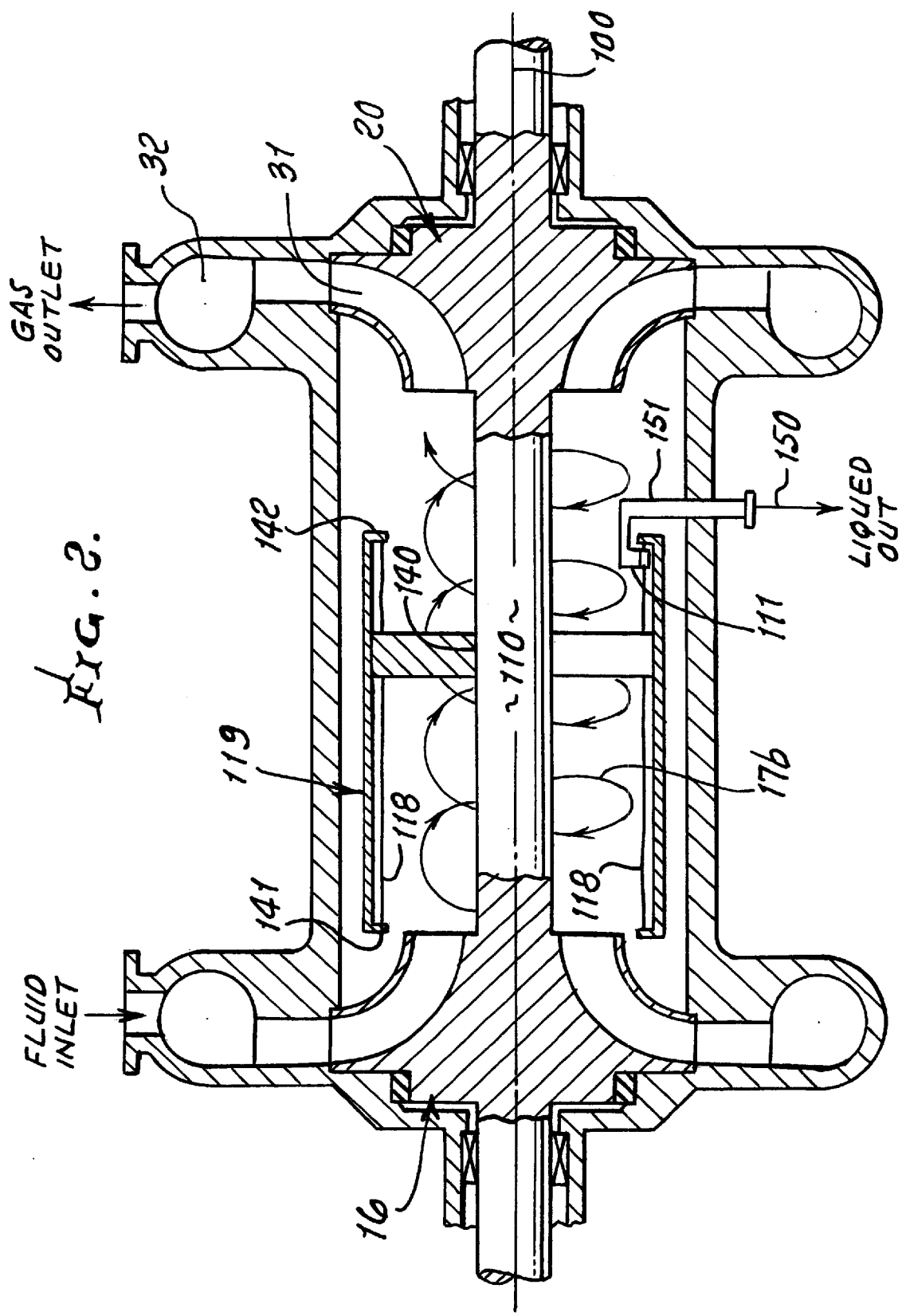

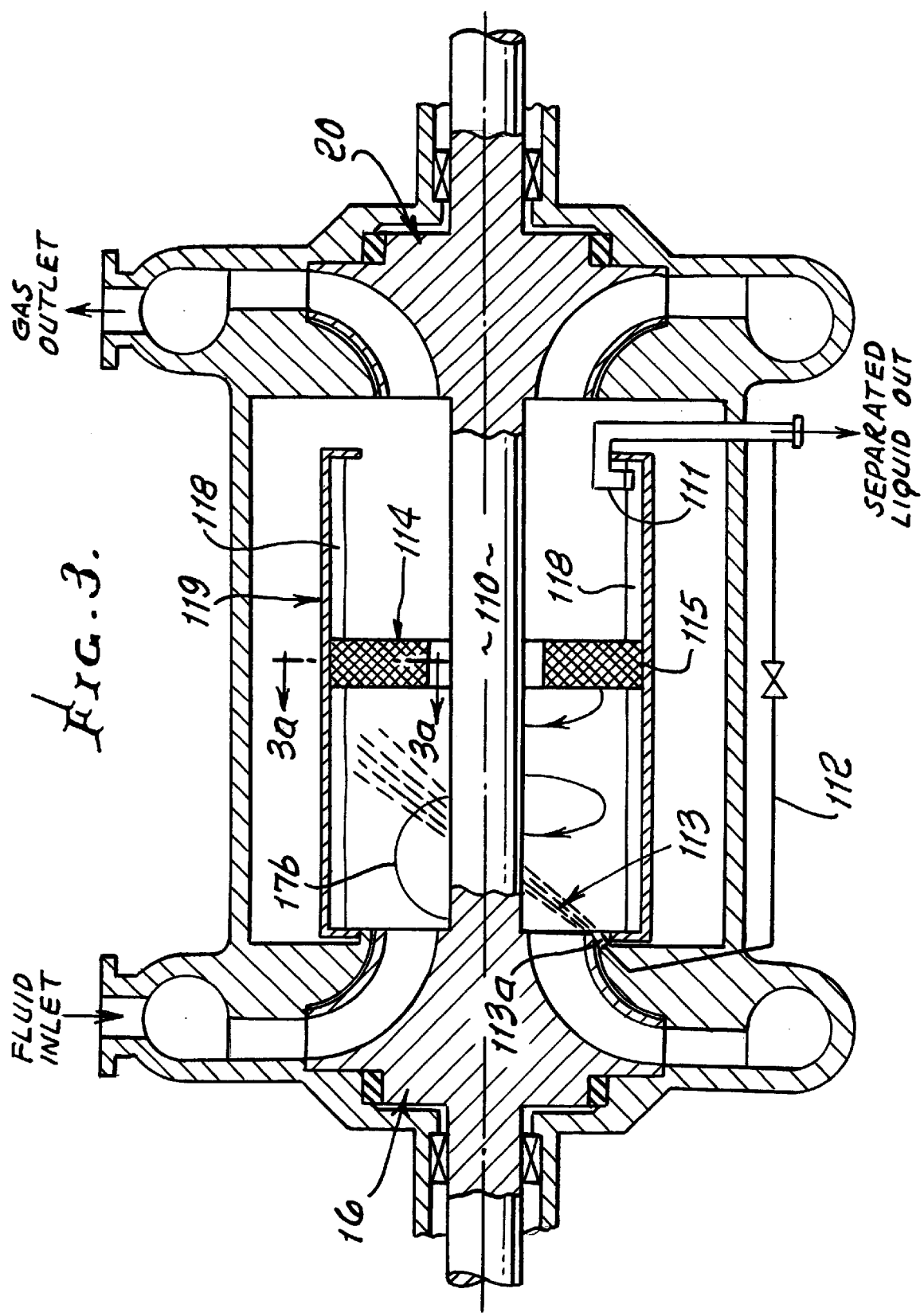

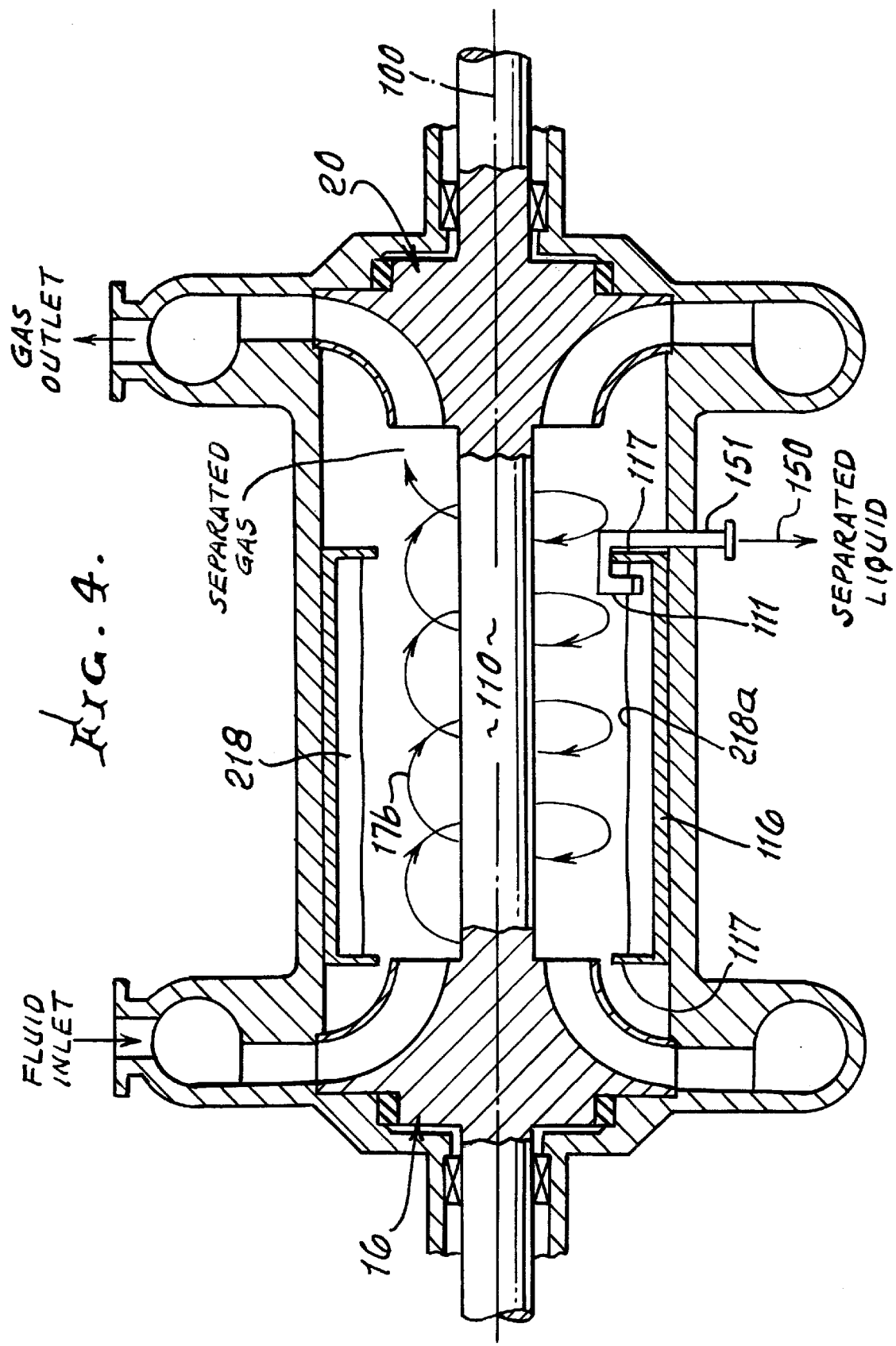

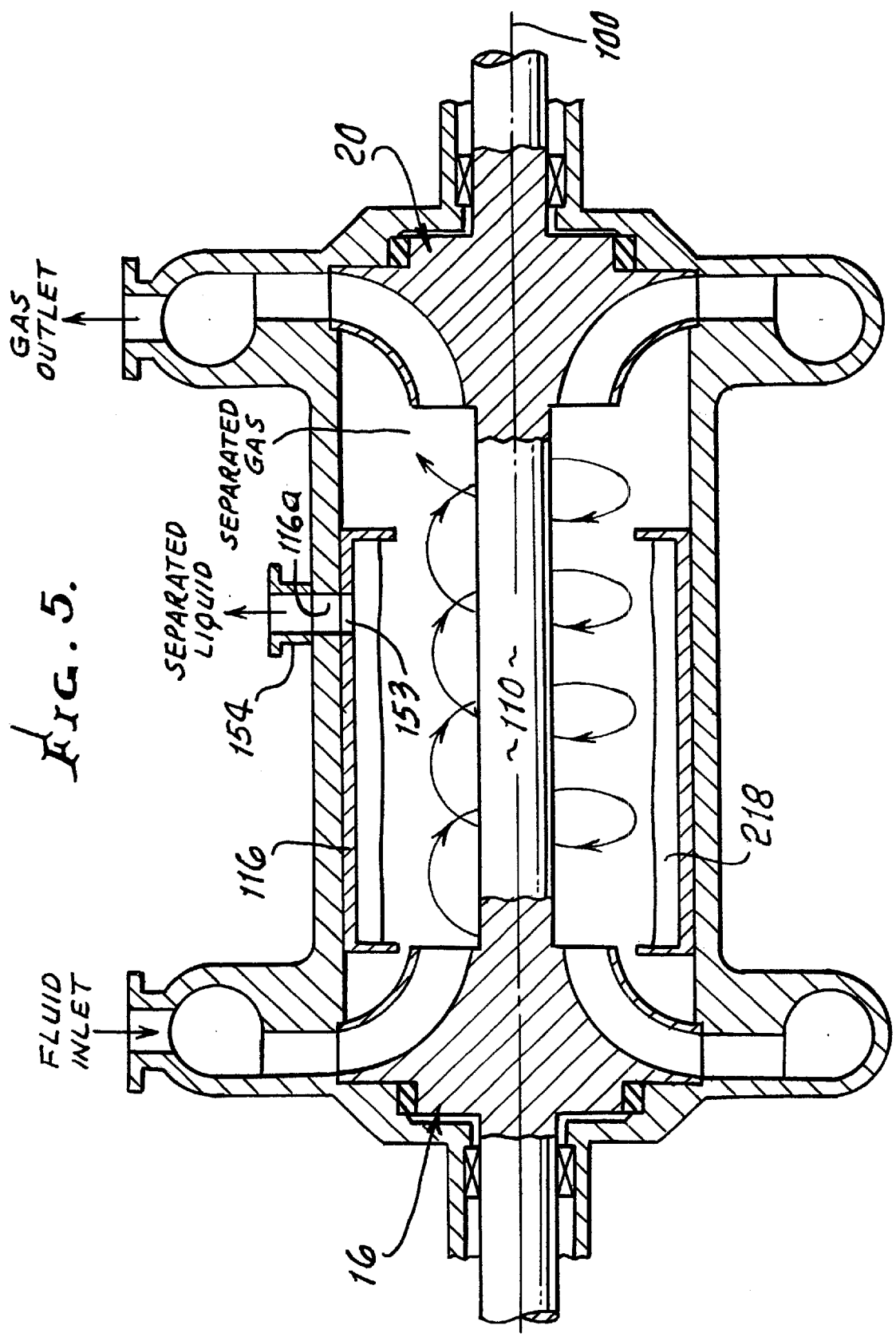

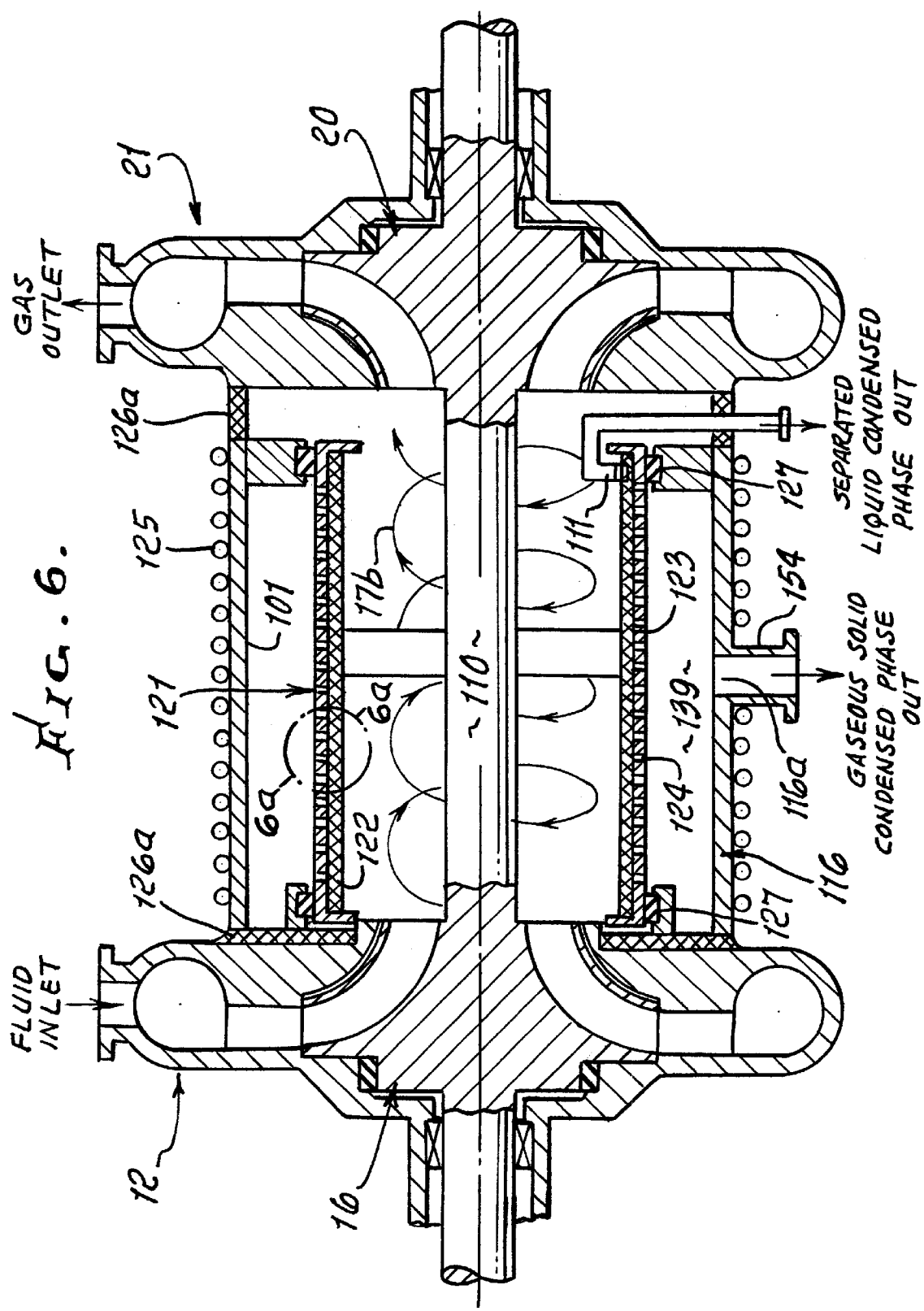

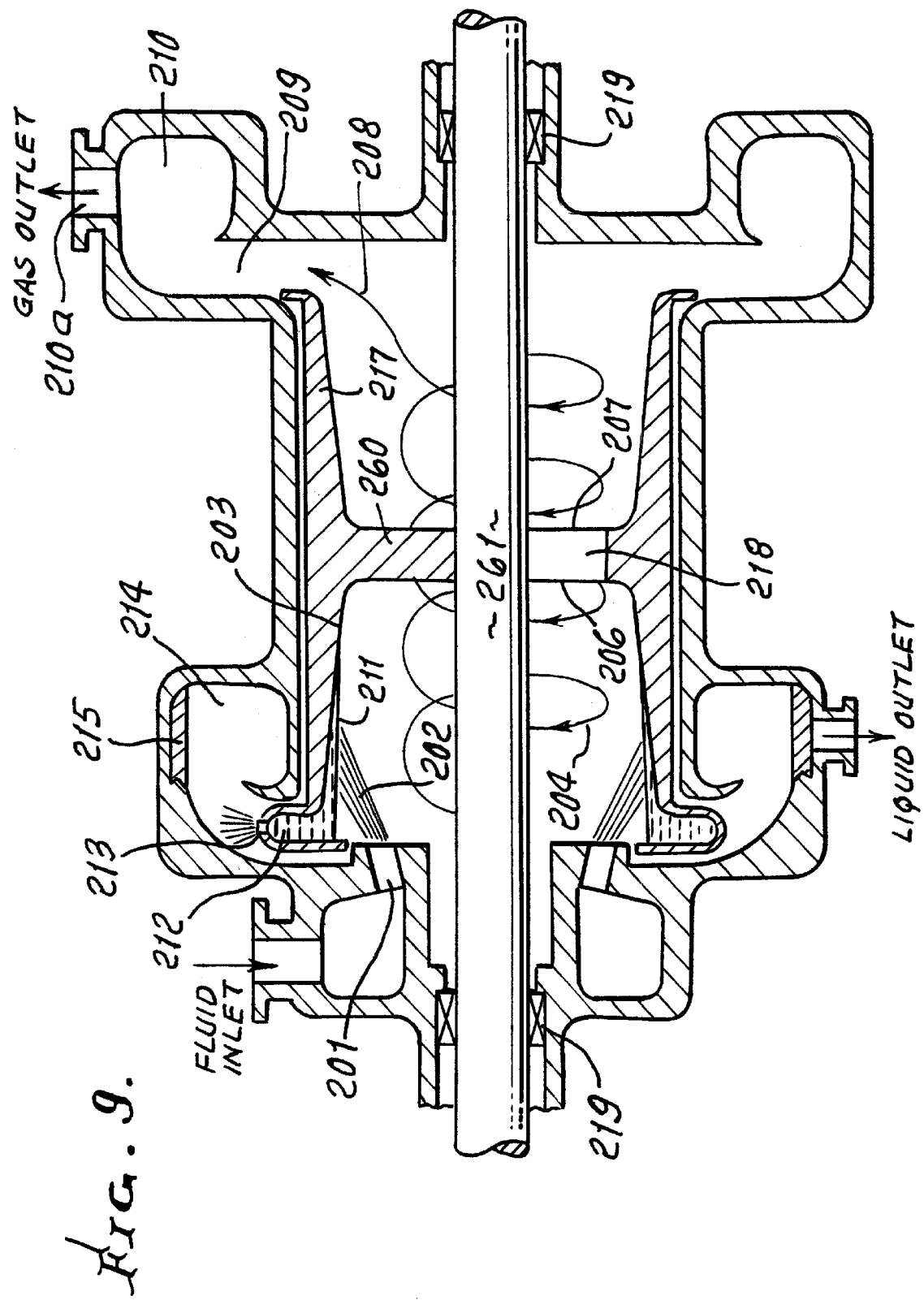

LIQUID EXTRACTION AND SEPARATION METHOD FOR TREATING FLUIDS UTILIZING FLOW SWIRL

BACKGROUND OF THE INVENTION

This invention relates generally to fluid separations, and more particularly to expanders and turbo-compressors operating into the low temperature region generating liquid phases and solid phases (condensed phases) that require removal. Removal of these condensed phases is accomplished by separation equipment that is an added component to a process system. Typically these separators are large and add cost, weight and volume to the process system. Centrifugal separators may be used to decrease the weight and volume, but added cost and complexity result from the requirements for a separate casing, shaft, seals and bearings.

There is need for centrifugal separation means for condensed phases that is integrated into the expander or turbo-compressor (rotating machinery). There is also need for such separation means wherein a separator member either is rotating with the rotating machinery or that is stationary.

Further, various methods have been used to chill gases by expansion to remove the resulting condensed phase, and to compress the remaining dry gas. The least efficient expansion method is a Joule-Thomson valve. The most efficient method is a near isentropic nozzle. A commonly used method which has an efficiency in between these methods is a turbo expander. The higher the expansion efficiency the more liquid is formed during the expansion. Subsequent compression of the remaining dry gas results in the lowest possible dew point.

In the past, the use of a nozzle for the complete expansion has been impractical. The friction loss in a stationary wall separator can be quite large. The subsequent heating of the separated liquid can result in vaporization and more moisture in the gas. However, with the use of a rotating surface the friction loss can be minimized resulting in maximum moisture removal from the gas. There is need for process and apparatus employing a nozzle and rotating surface separator, operating to maximize the liquid removal from a chilled gas stream and to compress the remaining dry gas by utilizing the head imparted during the expansion process.

SUMMARY OF THE INVENTION

It is a major object of the invention to provide an improved method for producing and separating liquid from gas, in a flow stream, the method including the steps:

a) expanding the flow stream at a first zone to reduce flow stream pressure and increase flow stream velocity, b) centrifugally separating liquid from gas in the expanded flow stream, in a second zone, c) and increasing the pressure of the gas, from which liquid has been separated, by converting kinetic energy of the gas into pressure, at a third zone.

As will be seen, a rotary apparatus may be provided for receiving the flow stream to expand same, at the first zone.

It is another object to provide a flow passage forming the second zone and within which the expanded flow stream swirls for centrifuging liquid outwardly toward a passage wall, and for conducting gas in the flow stream toward the third zone.

Further objects include provision of the first and third zones as rotary zones; provision of the second zone to include a rotary wall toward which liquid is centrifuged; provision of the second zone to include a non-rotating wall toward which liquid is centrifuged; provision of one of the first and third zones as a rotary zone; and provision for coupling the first and third zones, to rotate together.

It is a further object to maximize the liquid removal from a chilled fluid stream, and to compress the remaining dry gas, by utilization of the velocity head imparted during the fluid expansion process. The fluid may consist of a gas.

These and other objects and advantages of the invention, as well as the details of an illustrative embodiment, will be more fully understood from the following specification and drawings, in which:

DRAWING DESCRIPTION

FIG. 1 is a section showing a preferred integral separator, with a hollow shaft;

FIG. 2 is a section showing a modified integral separator, with a solid shaft and a scoop;

Figure 3A:
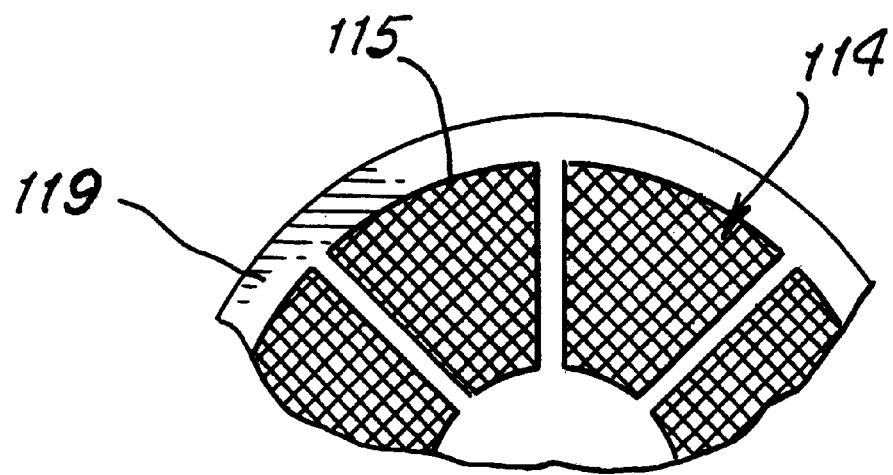
FIG. 3 is a section showing a further modified separator, with provision for removal of condensed phase droplets.
Figure 6A:
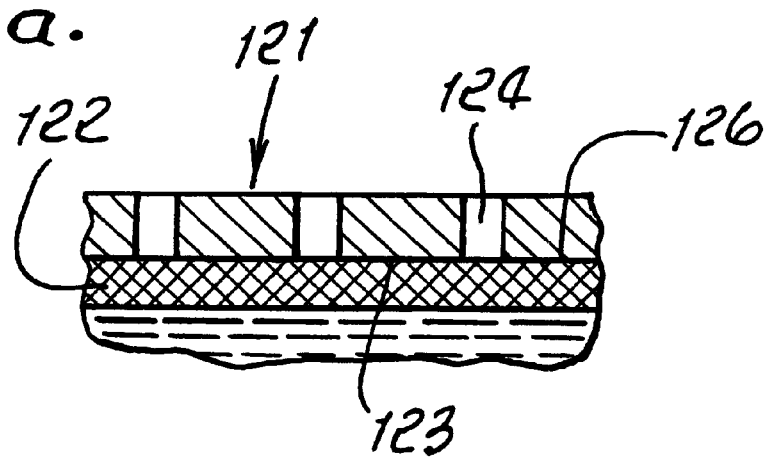
Figure 7:
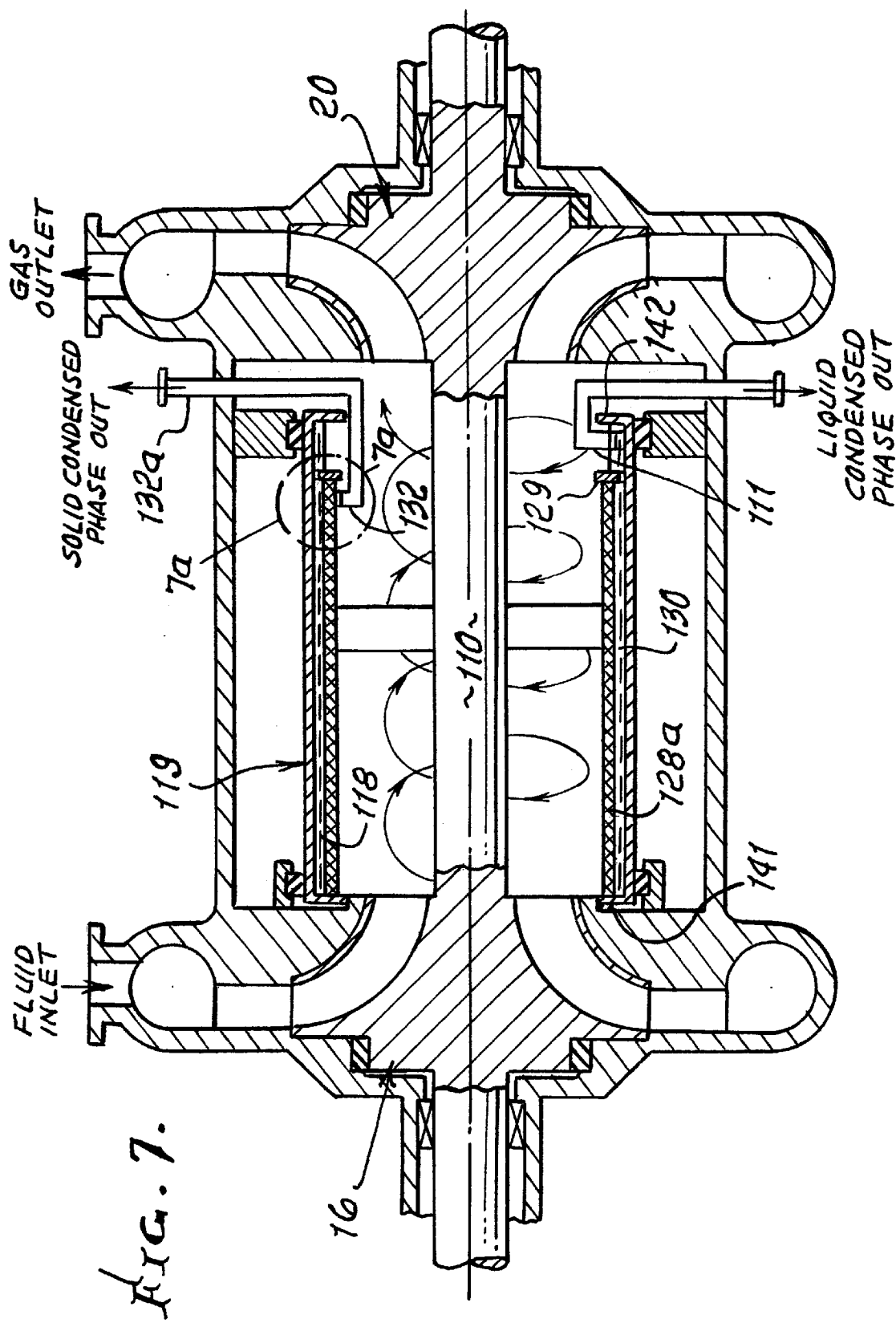
Figure 7A:
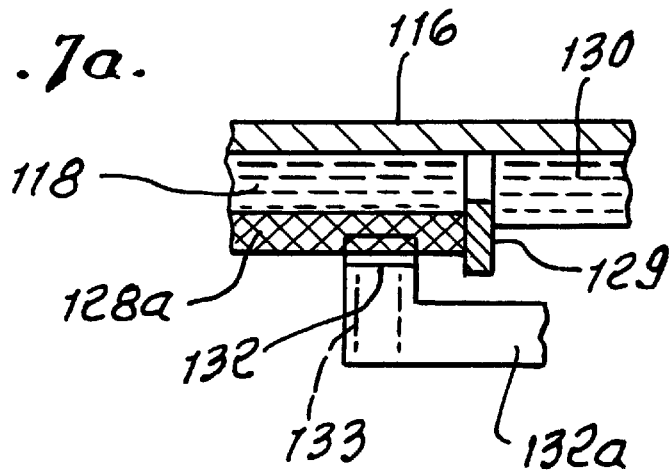
Figure 8:
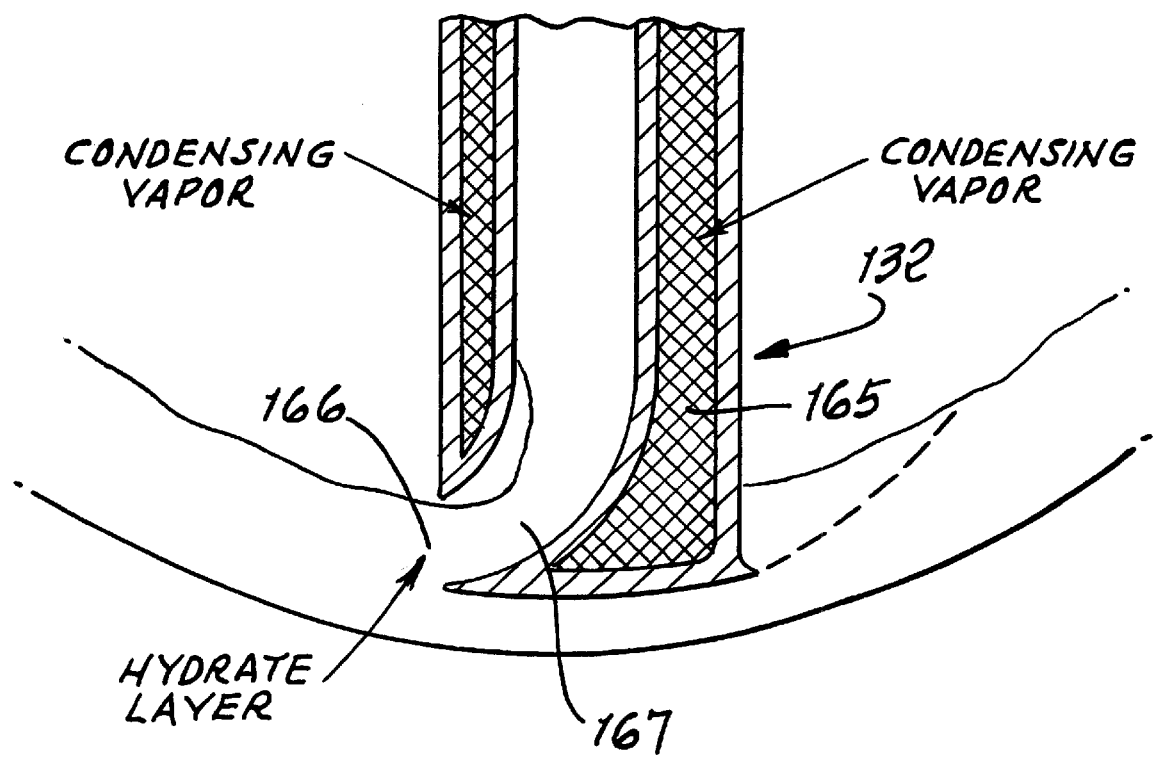

FIG. 3*a* is a fragmentary section taken on lines 3*a*—3*a* of FIG. 3;

FIG. 4 is a section showing a yet further modified separator, having a stationary integral separator structure;

FIG. 5 is a section showing a modified separator like that of FIG. 4, but with provision for radial removal of liquid;

FIG. 6 is a section showing an additionally modified separator, with provision for removal of a heavy solid condensed phase;

FIG. 6*a* is a fragmentary section taken on lines 6*a*—6*a* of FIG. 6;

FIG. 7 is a section showing a further modified separator, with provision for removal of a liquid solid condensed phase;

FIG. 7*a* is an enlarged fragmentary section taken on lines 7*a*—7*a* of FIG. 7;

FIG. 8 is an enlarged section showing a heated scoop for hydrate removal; and FIG. 9 is a section showing a modified separator employing a nozzle producing a two-phase jet.

DETAILED DESCRIPTION

FIG. 1 shows a turbo-compressor 10 with integrated condensed phase removal. Gas as for example natural gas a pressure $P_1$ is supplied to inlet 11 of a casing 12, and to annular ring 13. The gas is expanded in the non-rotary nozzles, 14*a*, and in the passages 15 of an expander rotor 16. The leaving gas stream at 17*a* contains a liquid condensed phase. The leaving swirl at 17*b* from the expander rotor 16 produces a centrifugal force field that separates the heavy condensed phase from the gas. The condensed phase is collected as layer 18 on a rotating wall rotating about axis 100. FIG. 1 shows a rotating wall 19*a* a hollow shaft 19 which is elongated axially and connects the expander rotor shroud 16*a*, to a compressor rotor shroud 20*a* associated with compressor rotor 20. The latter rotates within compressor casing 21, which is typically integral with 12.

FIG. 1 shows removal of the separated condensed phase via a radial passage 22, with a discharge 23, into a volute 24 in casing portion 101 intermediate 12 and 21, and integral therewith. The radial passage 22 acts to centrifugally pressurize the condensed phase liquid column 18*a*, and the pressurized liquid is expanded through a nozzle 26 rotating with shaft 19, at an angle to produce torque for recovering energy as shaft power. Shaft bearings are seen at 27 and 28, associated with 16 and 20.

The main gas stream is ducted into the compressor rotor inlet 30, and is compressed at 31 and supplied at 33 to the process, via casing porting 31 and 32.

Accordingly, the method includes
a) expanding the flow stream at a first zone to reduce flow stream pressure and increase flow stream velocity,
b) centrifugally separating liquid from gas in the expanded flow stream, in a second zone,
c) and increasing the pressure of the gas, from which liquid has been separated, by converting kinetic energy of the gas into pressure, at a third zone.

The method may also include providing a rotary expander receiving the flow stream to expand same, at said first zone; and providing a flow passage forming said second zone and within which the expanded flow stream swirls for centrifuging liquid outwardly toward a passage wall, and for conducting gas in the flow stream toward said third zone.

Alternatively, the rotating wall 119 may be attached as at 140 to a solid shaft 110, connecting the expander and compressor rotors 16 and 20 as shown in FIG. 2. Lips 141 and 142 are provided at opposite ends of wall 119 to contain the condensed phase layer 118. The condensed phase may be removed, either by the reaction passage 31 and volute 32 as also shown in FIG. 1, or by a scoop 111. The stationary scoop may be contoured to recover kinetic energy of the rotating condensed phase 118, into which the scoop projects, as increased pressure, producing an outlet flow 150 of the condensed phase, which is sub-cooled. Such flow passes through a duct 151 supporting the scoop. Other elements are the same as in FIG. 1.

FIG. 3 shows two methods to enable more efficient removal of very small condensed phase droplets.

In the first method a portion of the pressurized condensed phase 118 leaving the turbo-compressor is recycled at 112, and sprayed at 113, via nozzle 113*a* into the spiraling flow 17*b* to scrub the fine condensed phase droplets from the gas, for collection at rotating layer 118. The larger spray droplets in flow 17*b* are easily separated by the centrifugal force field.

The second method is to provide a porous member 114, in the swirling rightward flow path of the gas and condensed phase mixture 17*b*. Member 114 is supported by rotating wall 119. The fine droplets that are not deposited into layer 118 on the rotating cylindrical wall 119 by the centrifugal flow field are collected by the porous member 114. The high centrifugal forces produce very rapid radial drainage of condensed phase fluid from the porous member onto the rotating member, at 115. See FIG. 3*a*. Other elements remain the same as in FIG. 2.

FIG. 4 shows the use of a stationary tubular member 116 to collect the droplets separated from the gas by the centrifugal force field of the swirling flow. The stationary member contains the condensed phase by using annular flanges or lips 117, at each end. The separated condensed phase layer 218 has a velocity about axis 100 imparted by the angular momentum of the incoming condensed phase droplets and by the shear forces from the swirling gas flow 17*b* acting at surface 218*a* of layer 218. The velocity results in a centrifugal force field acting on 218, and that maintains the separated condensed phase layer 218 on the stationary wall 116. Removal is accomplished by a scoop 111, as in FIG. 2. Other elements are the same as in FIG. 3.

Another removal method shown in FIG. 5 is to provide a hole 141 in the non-rotating wall 116, which ducts the liquid to an outlet 142. Other elements are the same as shown in FIG. 4.

Processes occur in which the condensed phase is comprised of both solid and liquid particles or of solid particles only. For the case where the condensed phase is comprised of both solid and liquids the same separation means described in FIGS. 1–5 may be used to remove that condensed phase from the main gas stream. However, additional means can be provided to enable separation and removal of the solid condensed phase from the liquid condensed phase.

FIG. 6 illustrates a rotating separation means 121, in which provision is made to remove a dense solid condensed phase from the liquid condensed phase. The solid condensed phase is separated into a layer 122 at the wall 123 by the centrifugal force field acting on the mixture. Wall 123 rotates with shaft 110. The wall 123 has openings 124 through which gaseous solid condensed phase may be removed, radially outwardly. The openings may be holes or pores in a porous metal. The layer 122 is allowed to develop with no heat transfer. When a layer of sufficient thickness is reached, heat is applied from an external source 125 (for example, an electrical resistance coil). The heat causes vaporization of the solid condensed phase at the interface 126, with the wall. See FIG. 6*a*. A heat barrier material 126*a* is provided, as in annular forms shown, at the ends of tubular casing 101, to insulate the incoming gas and leaving gas in 12 and 21 from the heat source. The gaseous solid condensed phase in chamber 139 flows through the openings 116*a* in the wall 116 and is ducted at 142 for disposal or use. Seals 127 are provided at opposite ends of chamber 139 to prevent re-mixing of the separated solid condensed phase with the main gas stream 17*b*. The layer of solid condensed phase also provides insulation to reduce the amount of heat from 125 re-entering the main gas stream.

A scoop 111 is provided to remove the separated liquid condensed phase, as in FIGS. 3 and 4.

FIGS. 7 and 8 illustrate separation of a solid condensed phase which has a lower density than the liquid condensed phase. When a solid condensed phase occurs which is lighter than the liquid condensed phase, the solid condensed phase forms a layer 128*a*, which is located radially inward of the liquid layer 118 due to the buoyant force resulting from the centrifugal force field. In this case a weir 129 is provided which forces separation of the heavier liquid phase into a collection passage 130. The liquid condensed phase is removed by a scoop 111.

The solid condensed phase is removed by another scoop 132, and duct 132*a*. The walls of the solid condensed phase scoop can be heated by, for example, an internal heat pipe structure 133, to melt or vaporize the solid condensed phase, enabling removal from the separating structure without blocking the passages. Other elements are substantially the same as in FIG. 2.

In FIG. 8, the scoop 132 contains a passage 165 for condensing vapor. Solids or hydrates 166 enter the scoop at 167.

In the form of the invention seen in FIG. 9, gas is expanded to a low pressure in a nozzle 201. Moisture forms during the expansion resulting in a two-phase jet 202. The two-phase (gas and liquid) jet is impinged in a relatively tangential direction on a rotating separation surface 203. Most of the liquid separates on the initial impingement. However, the predominately dry gas follows a vortex flow pattern 204, centrifuging smaller droplets towards the separation surface 203.

The gas enters a blade row 218, at the inlet 206, in a flange 260 connecting rotary shaft 261 with tubular wall 217, where substantially all of the moisture has been removed. The velocity of the gas vortex at 206 is higher than at the nozzle exit because of the decrease in radius. The gas transfers momentum to the blades producing a torque which overcomes the windage losses and bearing losses of the rotor. The gas leaving the blades at 207 has an angular velocity equal to that of the blades.

The gas continues to swirl at the rotary velocity imposed by the solid wall 17. After leaving the rotary separator region the gas flows at 208 into a radial diffuser 209, where the kinetic energy of the gas is converted to pressure. The dry, pressurized gas enters a volute 210 and exits the structure at 210a.

The separated liquid forms a film 11, and flows under the action of the centrifugal force to a reaction passage 212. The resulting pressurized liquid is expanded through nozzles 213 adding torque to the rotating separator structure. The liquid is collected as a layer 215, in a volute 214, and subsequently flows from the structure.

With proper design the torque from the liquid jets at 213 and from the blades at 218 can balance the windage and bearing losses, to enable the velocity of the separator surface to be nearly equal to that of the gas, minimizing frictional losses and the resultant heating. This enables the shaft 220 to be totally enclosed and supported, for example, by magnetic bearings 219.

Alternatively, the rotor can be driven by an external motor such that the surface velocity is equal to the gas velocity, to minimize frictional heating.

I claim:

1. The method of separating liquid from gas in a flow stream, that includes
    a) expanding the flow stream at a first zone to reduce flow stream pressure and increase angular flow stream velocity, to an initial angular flow stream velocity,
    b) utilizing said initial angular flow stream velocity to centrifugally separate liquid from gas in the expanded flow stream, in a second zone,
    c) and also utilizing said initial flow stream velocity to increase the pressure of the gas, from which liquid has been separated, by converting the angular velocity of the gas into pressure, at a third zone.

2. The method of claim 1 including providing a rotary expander receiving the flow stream to expand same, at said first zone.

3. The method of claim 1 including providing a flow passage forming said second zone and within which the expanded flow stream swirls for centrifuging liquid outwardly toward a passage wall, and for conducting gas in the flow stream toward said third zone.

4. The method of claim 1 wherein said first and third zones are provided as rotary zones.

5. The method of claim 1 wherein said second zone is provided to include a rotary wall toward which liquid is centrifuged.

6. The method of claim 1 including removing solid particulate centrifuged in said second zone.

7. The method of claim 6 including ducting escape of said centrifuged particulate from a region outwardly of said second zone.

8. The method of claim 1 including collecting separated liquid in a layer on structure rotating about said second zone.

9. The method of claim 8 including providing for gas diffusing at said third zone.

10. The method of claim 5 wherein at least one of said first and third zones is provided as a rotary zone.

11. The method of claim 4 wherein said first and third zones are coupled to rotate together.

12. The method of claim 1 wherein said zones are located in axial sequence.

13. The method of separating liquid from gas in a flow stream, that includes
    a) expanding the flow stream at a first zone to reduce flow stream pressure and increase flow stream velocity,
    b) centrifugally separating liquid from gas in the expanded flow stream, in a second zone,
    c) and increasing the pressure of the gas, from which liquid has been separated, by converting kinetic energy of the gas into pressure, at a third zone,
    d) and wherein said second zone is provided to include a non-rotating wall toward which liquid is centrifuged.

14. The method of claim 13 wherein at least one of said first and third zones is provided as a rotary zone.

15. The method of separating liquid from gas in a flow stream, that includes
    a) expanding the flow stream at a first zone to reduce flow stream pressure and increase angular flow stream velocity,
    b) utilizing said angular flow stream velocity to centrifugally separate liquid from gas in the expanded flow stream, in a second zone,
    c) and also utilizing said flow stream velocity to increase the pressure of the gas, from which liquid has been separated, by converting the angular velocity of the gas into pressure, at a third zone,
    d) and including collecting centrifuged liquid, rotating said centrifuged liquid, and jetting said centrifuged liquid to create torque acting to aid rotation of structure at said second zone.

16. The method of claim 15 wherein said second zone is provided to include said structure in the form of a rotary wall toward which said liquid is centrifuged.

17. The method of separating liquid from gas in a flow stream, that includes
    a) expanding the flow stream at a first zone to reduce flow stream pressure and increase flow stream velocity,
    b) centrifugally separating liquid from gas in the expanded flow stream, in a second zone,
    c) and increasing the pressure of the gas, from which liquid has been separated, by converting kinetic energy of the gas into pressure, at a third zone,
    d) and including collecting centrifuged liquid, and rotating said centrifuged liquid to form a rotating layer, and removing liquid from said layer by employment of a scoop.

18. The method of claim 17 including providing a rotary shaft extending into proximity to said first and third zones, and using said shaft to confine the expanded flow stream to rotate about the shaft during said rotation of said centrifuged liquid, in spaced relation to said shaft.

19. The method of claim 18 including transmitting torque via said shaft from an expander at said first zone to a compressor at said third zone.

20. The method of claim 17 including returning removed liquid to said expanded flow stream, proximate said first zone.

21. The method of claim 17 including passing at least a portion of said expanded flow stream in said second zone into a perforated collector, for drainage to said layer.

22. The method of separating liquid from gas in a flow stream, that includes
    a) expanding the flow stream at a first zone to reduce flow stream pressure and increase flow stream velocity, b) centrifugally separating liquid from gas in the expanded flow stream, in a second zone, c) and increasing the pressure of the gas, from which liquid has been separated, by converting kinetic energy of the gas into pressure, at a third zone, d) and including collecting centrifuged liquid in a layer, and removing liquid from said layer, said layer subjected to rotation in a swirl direction of flow of said expanded flow stream, in said second zone.

23. The method of claim 22 including ducting escape of liquid from said layer, to the exterior of said second zone.

24. The method of separating liquid from gas in a flow stream, that includes a) expanding the flow stream at a first zone to reduce flow stream pressure and increase flow stream velocity, b) centrifugally separating liquid from gas in the expanded flow stream, in a second zone, c) and increasing the pressure of the gas, from which liquid has been separated, by converting kinetic energy of the gas into pressure, at a third zone, d) removing solid particulate centrifuged in said second zone, and e) and including scooping solid particulate centrifuged in said second zone, as a part of said removing step.

* * * * *